United States Patent [19]
Hunter

[11] 3,951,112
[45] Apr. 20, 1976

[54] ROTARY INTERNAL COMBUSTION ENGINE WITH ROTATING CIRCULAR PISTON

[76] Inventor: Lee Hunter, 13501 Ladue Road, Creve Coeur, Mo. 63141

[22] Filed: Nov. 21, 1974

[21] Appl. No.: 525,762

[52] U.S. Cl. ............................ 123/8.45; 418/61 R; 418/146; 418/147; 418/64
[51] Int. Cl.² .................... F02B 55/14; F01C 1/02; F01C 19/00
[58] Field of Search .................. 123/8.45; 418/61 R, 418/146, 147, 241, 64

[56] References Cited
UNITED STATES PATENTS

| | | | |
|---|---|---|---|
| 449,821 | 4/1891 | Nash | 418/61 R |
| 851,962 | 4/1907 | Prossen | 123/8.45 |
| 869,339 | 10/1907 | Veitch | 418/147 |
| 1,661,593 | 3/1928 | Bodker | 123/8.41 |
| 2,382,259 | 8/1945 | Rohr | 418/146 |
| 3,151,807 | 10/1964 | Froede et al. | 418/61 A |
| 3,181,509 | 5/1965 | Simon | 418/146 |
| 3,200,796 | 8/1965 | Kraic et al. | 418/61 R |
| 3,381,668 | 5/1968 | Agren | 418/61 R |
| 3,812,828 | 5/1974 | Griffiths | 418/61 R |
| 3,863,611 | 2/1975 | Bakos | 418/147 |

FOREIGN PATENTS OR APPLICATIONS

| | | | |
|---|---|---|---|
| 724,493 | 11/1966 | Italy | 123/8.45 |
| 16,508 | 12/1912 | France | 123/8.41 |

Primary Examiner—John J. Vrablik
Attorney, Agent, or Firm—Gravely, Lieder & Woodruff

[57] ABSTRACT

A rotary internal combustion engine wherein the combustion chamber and the piston is formed with similar generally circular surfaces with the piston moving in an eccentric path of rotation within the combustion chamber and carrying with it improved combustion chamber separating vanes with sealing elements movable over the intake and exhaust ports and acting to prevent back flow and leaking around the vanes.

8 Claims, 23 Drawing Figures

ROTARY INTERNAL COMBUSTION ENGINE WITH ROTATING CIRCULAR PISTON

BRIEF SUMMARY OF THE INVENTION

This invention relates to internal combustion engines of the type having a rotating piston movable in an eccentric path in a cylindrically shaped combustion chamber. In recent years, the non-reciprocating internal combustion engine has received considerable attention, and one of the most notable is the Wankel engine which is characterized by a specially shaped epitrochoid combustion chamber and a rotating piston of generally triangular configuration. It is recognized that in an engine of the latter character it is particularly important for reasons of engine efficiency to maintain the respective combustion chambers separate from each other and to minimize the cross-communication between such chambers. Sealing vanes must be of a size and configuration to establish contact between the surfaces of the piston and the surfaces of the walls defining the combustion chambers. It is also recognized that the intake and exhaust ports in such an engine must be of a size to permit adequate breathing, both for the intake cycle and for the exhaust cycle. In the prior Wankel engine the configuration of the piston with its sharply defined apexes permits back flow between two adjacent chambers, thereby interferring with the clear cut functioning of each of the combustion cycles.

The objects of the present invention are to provide a rotary engine constructed with the working components having similar circular shapes for economical production, to provide an arrangement of vanes and seals for the moving parts of the engine so that the combustion chambers will be effectively isolated from each other, to provide seals which will bridge over and control the intake port, exhaust port, and spark plug opening so as to minimize or prevent back flow or cross-communication between adjacent chambers, and to provide an internal combustion engine with components that are relatively economical to manufacture and assemble thereby keeping the production cost at a minimum.

A preferred embodiment of the present invention includes a housing having a circular chamber defined by an annular frame member and a pair of cooperating face plates to define an annular working chamber having a circular peripheral wall, formed with intake and exhaust ports, and a spark plug opening, a piston formed with a generally circular shaped face, suitable bearing between a crankshaft and the piston so that the rotation of the piston eccentrically in the combustion chamber will drive the crankshaft, seal means between the piston and the combustion chamber arranged to bridge the intake and exhaust ports, and the spark plug opening, for prevention of back flow or cross-communication between the chambers formed between any pair of vanes, and means to simplify the assembly of the components and to provide for the necessary cooling and drive for the accessories such as distributor, oil pump and fuel pump.

BRIEF DESCRIPTION OF THE DRAWINGS

The presently preferred embodiment of the internal combustion engine has been disclosed in the accompanying drawings wherein.

DETAILED DESCRIPTION OF THE EMBODIMENTS

Figure 1:
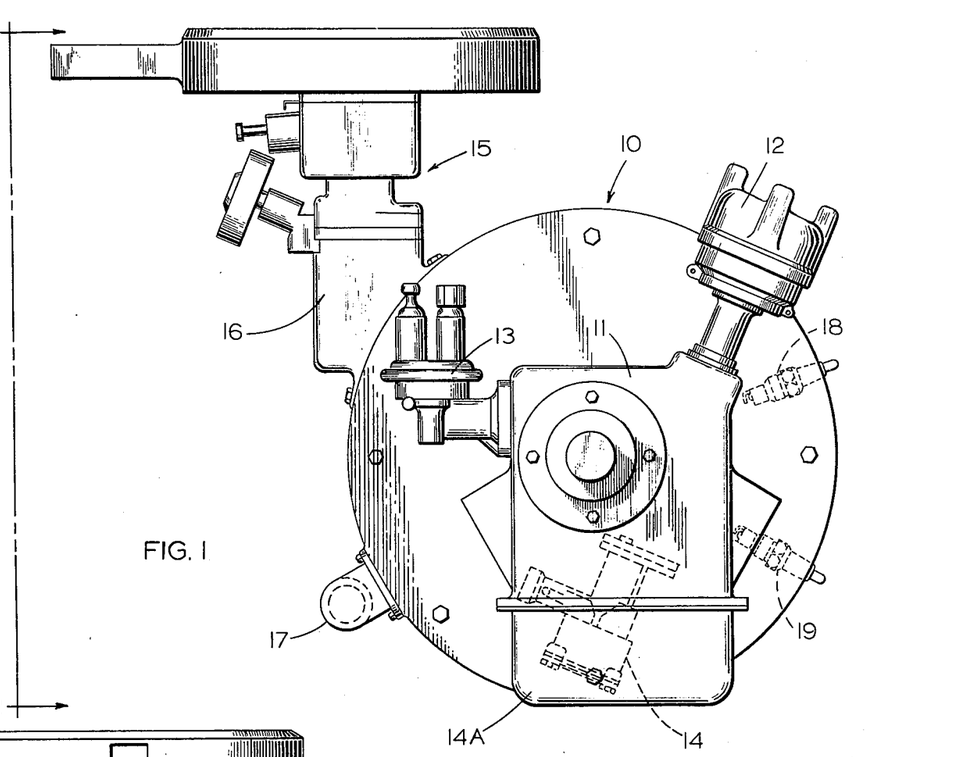
FIG. 1 is a front elevational view of the engine showing the organization of the various operating components.
Figure 2:
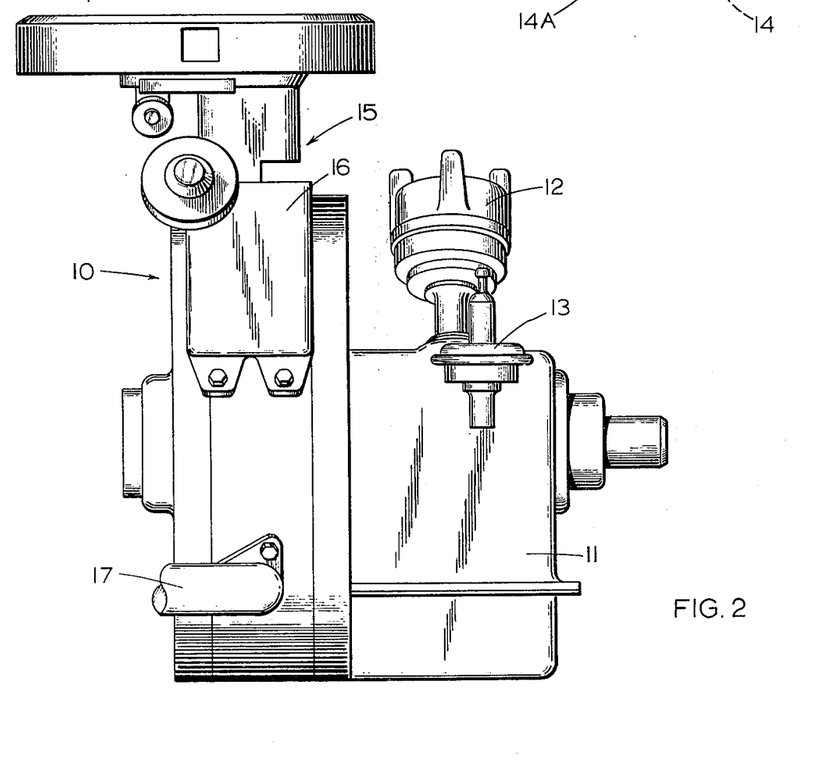
FIG. 2 is a side view of the engine as seen along line 2—2 in FIG. 1.

Reference will be directed to FIGS. 1 and 2 where the general characteristics and arrange of components of the present rotary internal combustion engine may be seen. The frame 10 of the engine is generally circular in end view and carries at its forward portion a housing 11 for the various operating components normally provided for driving the usual distributor 12, fuel pump 13, and an oil pump 14 in the oil sump 14A to supply lubricant to all of the surfaces and moving parts. The details of these components are believed unnecessary to show. A suitable carburator 15 and its normal compliment of accessory elements is mounted on an intake manifold 16 which is attached to the engine frame 10. A suitable exhaust manifold 17 is also carried by the frame 10. There is shown in phantom outline the location of a pair of spark plugs 18 and 19 so as to complete the general disclosure of the necessary components and accessories that go to make up an operative internal combustion engine.

Figure 3:
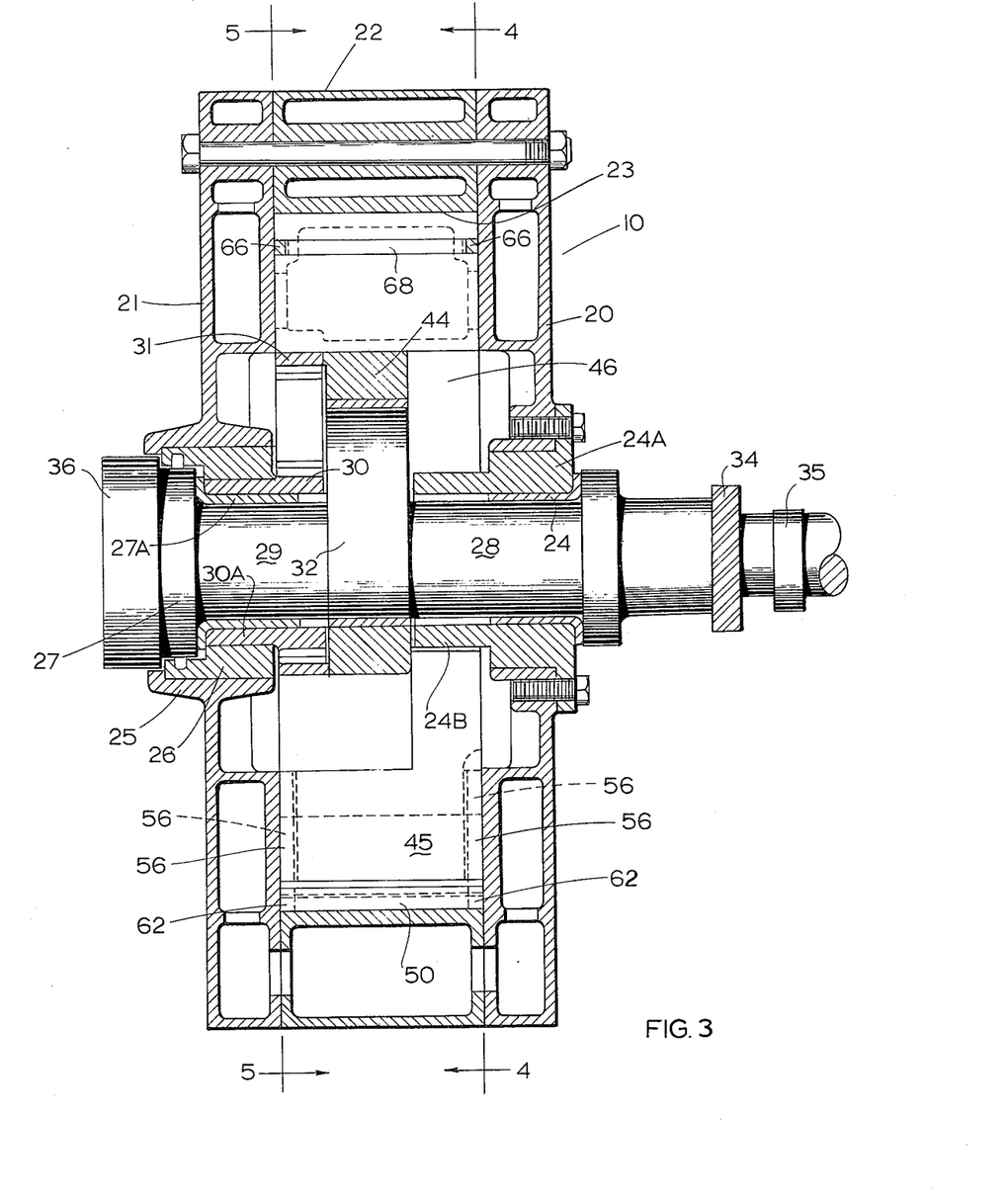
FIG. 3 is a fragmentary transverse sectional view seen along line 3—3 in FIG. 4.
Figure 4:
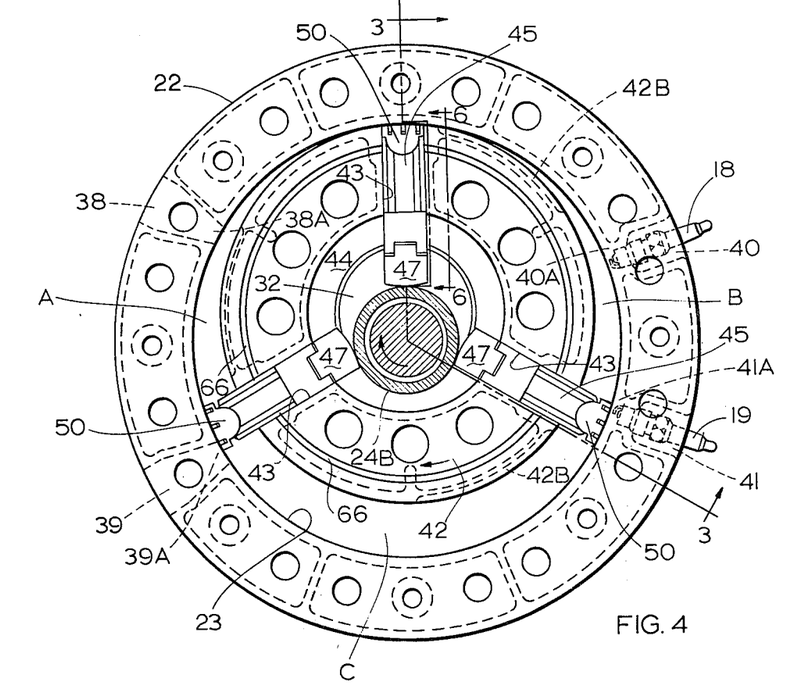
FIG. 4 is a fragmentary view taken along the line 4—4 in FIG. 3.
Figure 5:
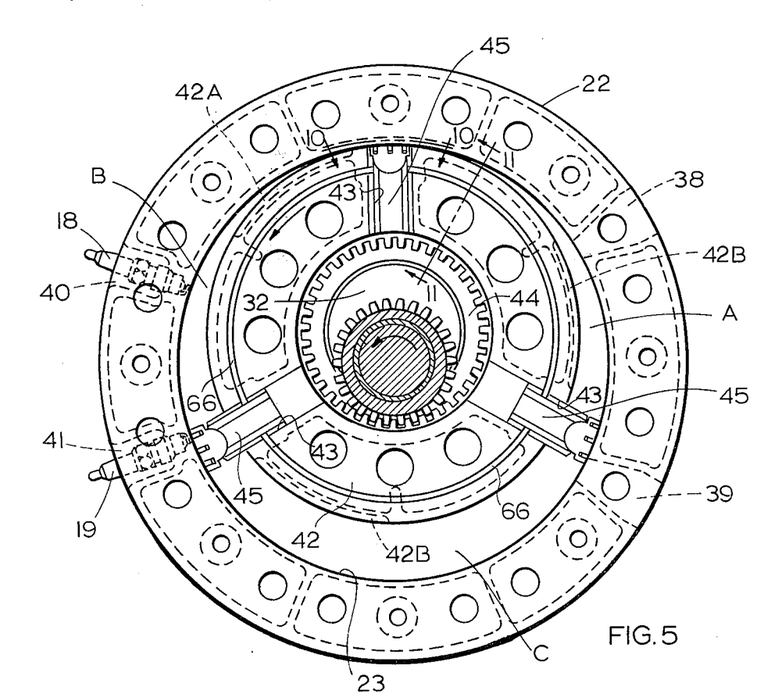
FIG. 5 is a further fragmentary view taken along the line 5—5 in FIG. 3.
Figure 6:
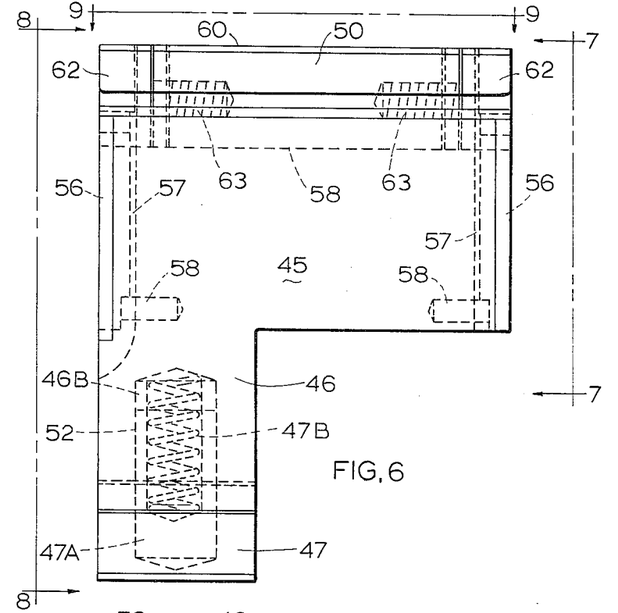
FIG. 6 is a side view of a typical vane as seen along line 6—6 in FIG. 4.
Figure 7:
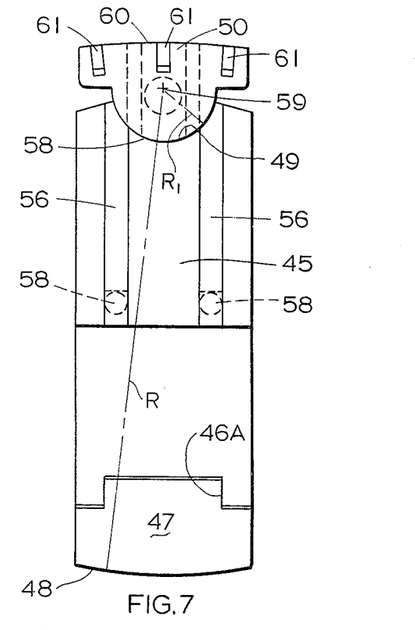
FIG. 7 is an edge view of the vane of FIG. 6 seen along line 7—7.
Figure 8:
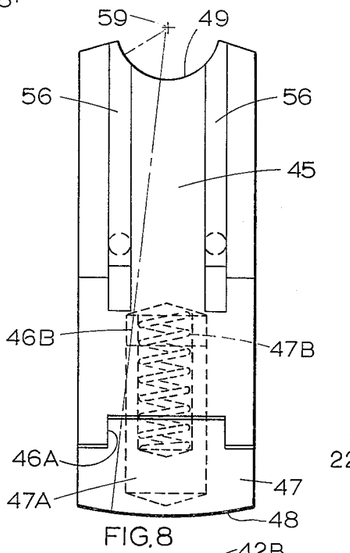
FIG. 8 is another edge view of the opposite edge of the vane of FIG. 6 seen along line 8—8.
Figure 9:
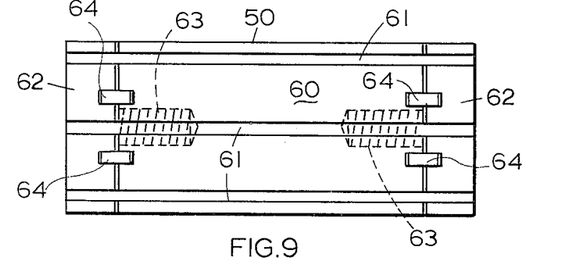
FIG. 9 is an end view of the vane of FIG. 6 seen along line 9—9.

Attention will now be directed to FIGS. 3, 4 and 5 for a more thorough understanding of the features and characteristics of the present engine. The frame 10 of the engine is made up of a front face plate 20, a rear face plate 21 and an annular frame member 22. These three parts enclose an annular combustion space in which the peripheral wall 23 is circular. The front face plate 20 carries a fixed bearing 24 in a sleeve 24A having an axial extension with an exposed surface 24B, and the rear face plate 21 has an enlarged flange 25 which supports a fixed spacer sleeve 26. The sleeve 26 carries the hub 30A of a fixed gear 30. A crankshaft 27 has a journal 28 received in the front bearing 24 and a journal 29 received in the rear bearing 27A. The gear 30 is fixed in the spacer sleeve 26 and does not rotate with the crankshaft 27, but presents its teeth to mesh with teeth on an internal ring gear 31. The crankshaft 27 is formed with an eccentric 32 between the bearings 24 and 27A and at one side of the bearing surface 24B between the eccentric 32 and the front bearing 24. The forward end of the crankshaft 27 is extended to provide a distributor drive gear 34 and a fuel pump operating cam 35. the rearward end of the crankshaft is provided with a power take-off flange 36.

The more important components of the engine can be seen to advantage in FIG. 4 and attention will be directed to that view of the drawing. The annular frame member 22 is seen to be suitably cored out to provide passages for cooling medium and to provide an intake passage 38 and an exhaust passage 39, both passages being located at a common side of the frame and having a shape and size to allow for proper breathing. On the opposite side of the frame 22 spark plugs 18 and 19 are shown mounted in suitable pockets 40 and 41 and the pockets open inwardly through the circular surfaces 23 of the annular grame member 22. It is seen that the crankshaft 27 is located on an axis of rotation which is at the geometric center of the circular surfaces 23, thereby placing the bearing 24B in concentric relation to the circular surfaces 23 of the frame member 22.

The piston of this engine is a generally circular member 42 which is suitably formed with three slots 42 spaced 120° apart, and each slot 42 is radially directed and the outward portion thereof extends through the axial thickness of the piston 42 (FIG. 3). The piston 42 is formed with a main connecting ring 44 which is in operative engagement with the eccentric 32 on the crankshaft 27. Accordingly, the inner portion of each of the radial slots 43 is off-set so as not to interrupt the continuity of the ring 44, thereby dictating the L-shape of each of the vanes 45 which are operatively mounted in the slots 43. Each vane 45 is formed with a radially inwardly directed leg 46 having a cap 47 on its inner most end formed with a curved face 48, and the curvature of the face 48 is formed to have a constant working fit with the curvature of the bearing surface 24B for the sleeve 24A. The outer extremeties of the respective vanes 45 are formed with a circular recess or socket 49 to receive the body of a rocker element 50 such that the rocker body can rock relative to the vane 45. It is observed that the respective rocker elements 50 have a substantial circumferential width, and this width is chosen so that it will completely bridge the inner open ends 40A and 41A of the spark plug pockets 40 and 41 respectively. These rocker elements 50 are also circumferentially sufficiently wide to bridge the inner open ends 38A and 39A of the respective intake passage 38 and exhaust passage 39 to block back flow or cross-communication between any two spaces formed on the opposite sides of a vane 45. The vanes are caged between the surface 23 and the surface 24B as shown in FIG. 4 and define three separate chambers shown with chamber A in communication with the intake passage 38, chamber B in communication with the spark plug 18 (and possibly an additional spark plug 19), and chamber C in communication with exhaust passage 39.

An important feature of this engine resides in the configuration of the respective vanes 45 and the sealing function achieved by each. The three vanes are alike so a description of one will suffice for all. Attention will be directed to FIGS. 6 to 10 where a typical vane 45 is seen to have a body with an off-set leg portion 46 which is formed with a cavity 52 to receive an expansion device 53.

Device 53 includes a cap seated in a notch 46A in the leg 46 to enclose a pin 47A with an internal compression spring 47B. The spring holds the pin 47A in the cap 47 so a pressure fluid reservoir 46B is established. The device compensates for thermal effects.

The radially directed outer end of the vane 45 is formed with the recessed seat 49 to receive the rocker element 50 and each side edge of the vane 45 is formed with a pair of grooves (FIG. 10) which are adapted to receive seal elements 56. Each seal element or blade 56 is supported on a wave spring 57, and a retainer pin 58 is seated in the vane 45 adjacent the inner ends of each groove to engage a notch in the present respective seal blades, and prevent the inward displacement thereof. These seal blades 56 engage the surfaces of the front and rear face plates 20 and 21. the rocker element 50 is formed with an inner curved face 58 matching the seat 49 so that it may rock about a center axis 59. The outer face 60 of the rocker element is formed with parallel grooves to receive seal elements or blades 61, and each blade 61 is supported on a wave spring (not shown) that is similar to the wave spring 57. In addition, the rocker element 50 is provided with end caps 62 which are urged outwardly by springs 63 to engage the inner faces of the front and rear face plates 20 and 21. Each end cap carrries a plurality of seal elements or blades 64 supported on wave springs of the type noted at 57 in FIG. 6.

Figure 10:
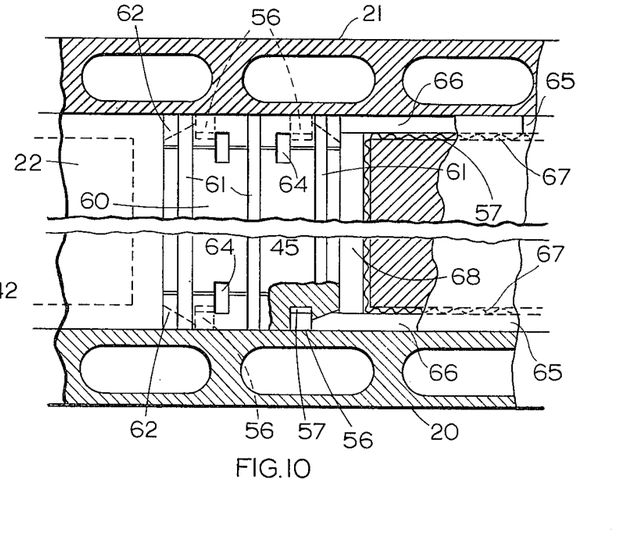
FIG. 10 is a fragmentary view of a typical vane seal detail as seen at line 10—10 in FIG. 5.

It can be seen in FIG. 10 that the rotary piston 42 has circumferentially directed grooves 65 in its opposite sides to receive seal blades 66 and back up wave springs 67. The ends of the blades are bevelled to seat on the margins of the vanes, and a transverse seal blade 68 and back up wave spring engages the respective sides of the vane 45 between the circumferentially positioned seal blades 66. A similar showing is seen in FIG. 3.

Figure 11:
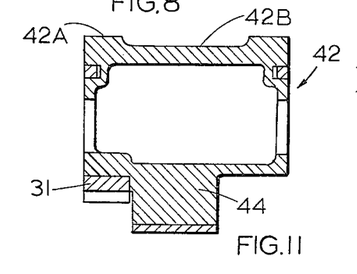
FIG. 11 is a fragmentary section view of the rotor taken at line 11—11 in FIG. 5.

FIG. 11 is a fragmentary section view of the rotary piston 42 to show a typical cross section at a combustion recess. The piston 42 has a circular face 42A interrupted by radially directed slots 43 (FIG. 4), and at 120° spacing there are combustion recesses 42B which are circumferentially elongated as desired. The rotor is formed with an inner main ring 44 which is the backbone of the body, and this ring engages the eccentric 32 on the crankshaft 27. The internal gear ring 31 is pressed into position at one side of the main ring 44 to make it integral while the opposite side of the main ring 44 is open to communicate with each radial slot 43, thereby allowing the leg portion 46 and its cap 47 to project inwardly for aligning the cap 47 with the axial portion 24B of the fixed bearing 24 (FIG. 3).

Looking at FIG. 4, it can be seen that the rocker elements 50 on each vane body 45 has its end face 60 shaped to fit the curvature 23 of the circumferential wall of the frame member 22. The piston 42 rotates in an eccentric path, thereby causing the vanes 45 to experience changes in radial alignment with the curved wall 23. This change in alignment is cared for by allowing the rocker elements 50 to move about an axis 59 which is the center of the curved socket 49. At the same time the inner end cap 47 on each vane body 45 moves in a path back and forth across the surface of the fixed bearing 24B (FIG. 4) while remaining always parallel to the radial alignment. This movement of the vane bodies 45 is accounted for their being caged between the frame surface 23 and the inner bearing 24B. The curvature of the cap face 48 is generated from the axis 59 for the rocker element 50. As a result of the construction of the several parts of each vane 45 a close fit can be achieved at the surface 24B on the fixed bearing and at the inner curved surface 23 of the annular frame member 22. Production tolerances and thermal variations are easily accounted for by the devices 53 and the spring support under the seal blades 61 in the end face 60 of the rocker elements 50.

Should it be found desirable, a second igniter or spark plug 19 (FIG. 4) may be employed to supply a delayed or second ignition spark to assure the most complete combustion of the fuel-air mixture. Other features and structural components of the present embodiment are shown in less detail as they are believed to be generally common to most engines, such as the cooling system, the connection of separable parts, the particular character of bearings, and gasket means.

The preferred ratio of the gears 31 and 30 is such that the crankshaft 27 rotates one revolution while the piston 42 rotates only one third of a revolution. The relatively slower speed of the piston 42 will reduce the wear on the inner end cap surfaces 48 which bear upon the bearing extension 24B.

Figure 12:
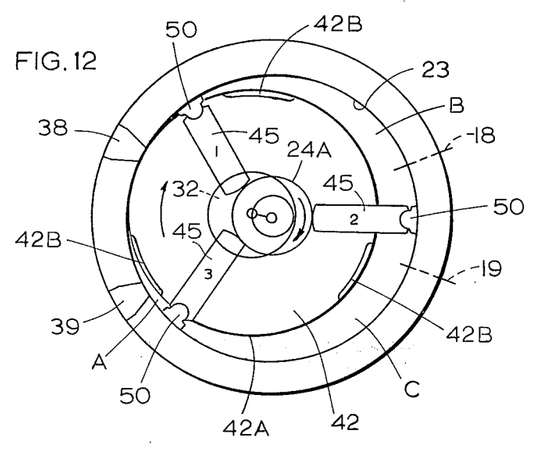
FIG. 12 to 23 are schematic views of the operation of the rotor in the housing for several positions to show the cycle of events which take place.
Figure 13:
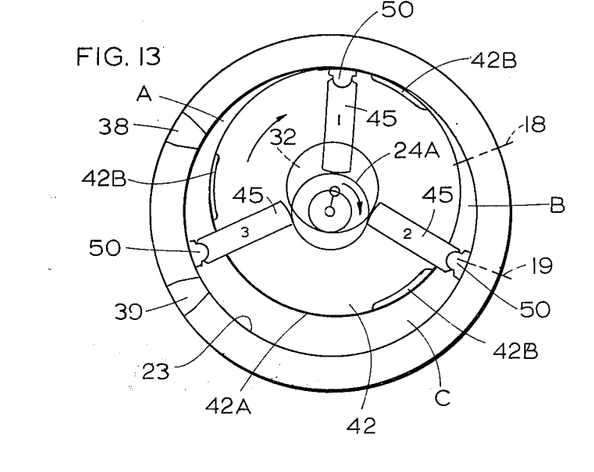
Figure 19:
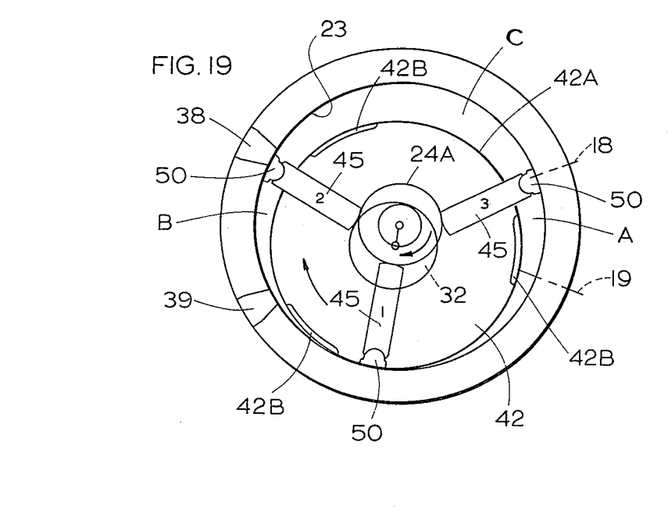
Figure 20:
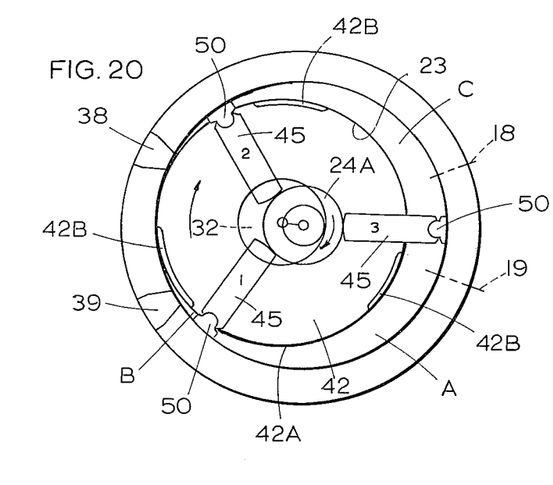
Figure 21:
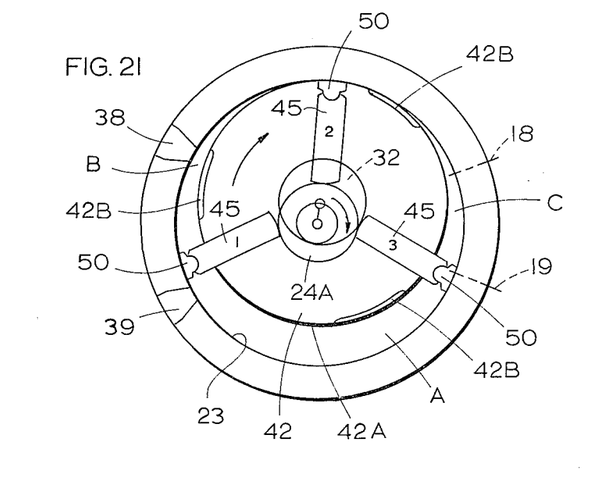

In the schematic views of FIGS. 12 to 23 there is set forth the salient phase characteristic of this four cycle engine and attention will be first directed to chamber A formed between the rotor 42 and its sealing vanes 45 and the peripheral wall 23 in the annular chamber. In FIG. 12 chamber A communicates with the outlet passage 39 and the inlet passage 38 so that the exhaust phase is near completion. The further rotation of the rotor 42 to the position of FIG. 13 continues the intake phase, and this phase continues for chamber A through the positions of FIGS. 14 and 15. Beginning with the view of FIG. 15 and continuing into FIG. 17 it can be seen that compression is taking place, and ignition occurs at the position of FIG. 18 when the recess 42B in the rotor 42 is opposite the spark plug 18. Expansion of the burning fuel in chamber A is seen in FIGS. 19 and 20, and in FIG. 21 the exhaust passage 39 opens so the spent gases are exhausted as the rotor 42 moves through positions seen in FIGS. 22 and 23. From the position of FIG. 23 the chamber A returns to the position of FIG. 12 to complete one revolution of rotor 42.

Figure 14:
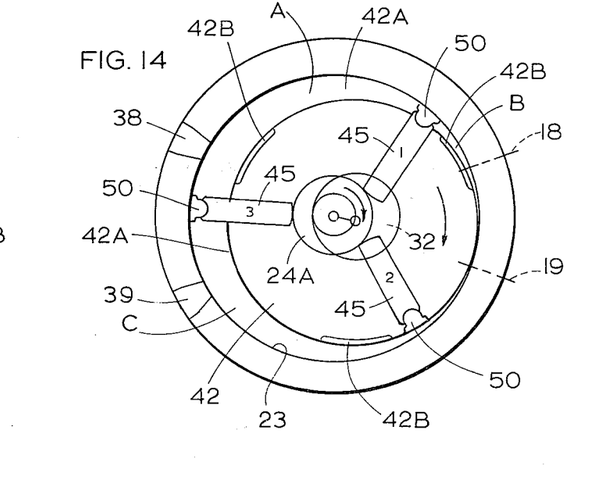
Figure 15:
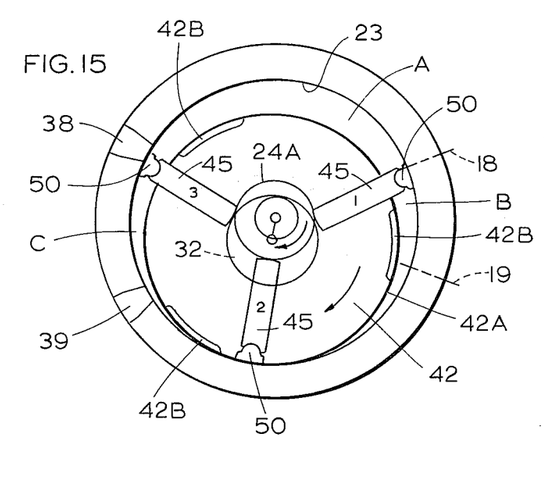
Figure 16:
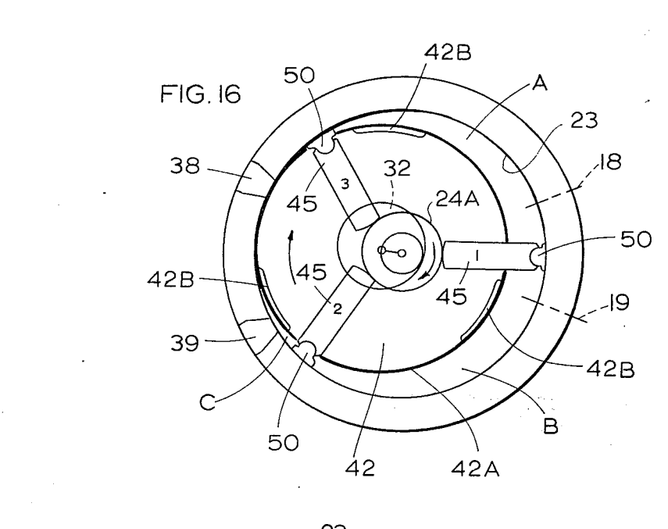
Figure 17:
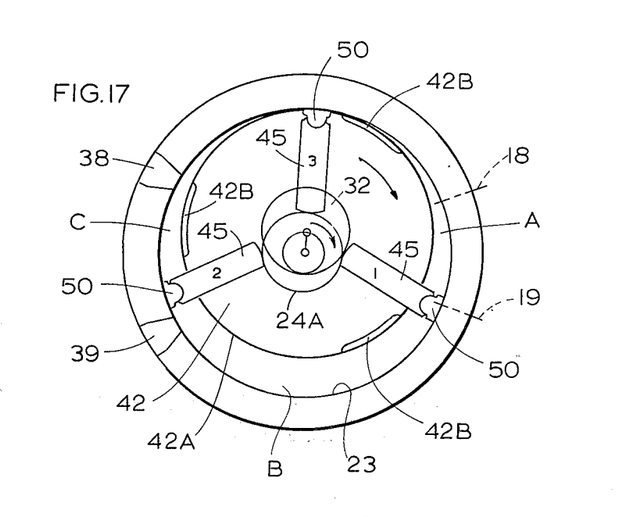
Figure 18:
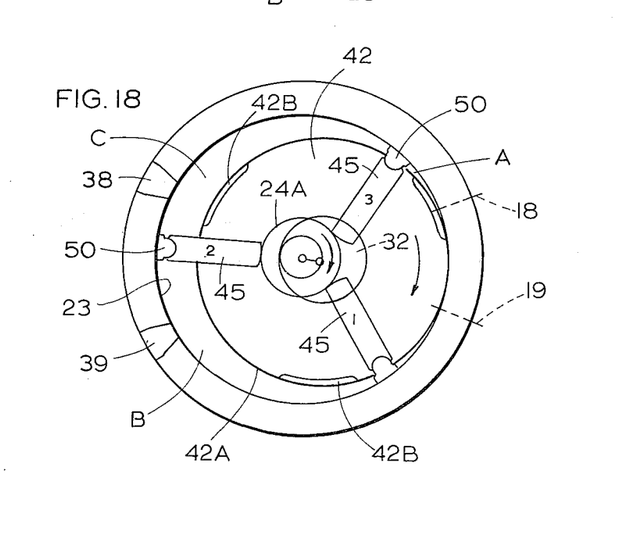

While chamber A is in the position of FIG. 12, chamber B is in its compression phase and this continues to the position of FIG. 14 where ignition occurs. Chamber B goes through its expansion phase for positions in FIGS. 15 and 16, and the exhaust phase has occurred at FIG. 17 and continues this phase to the position seen in FIG. 21. The suction phase for chamber B is in progress at the position in FIG. 20 and continues to the position in FIG. 23.

Figure 22:
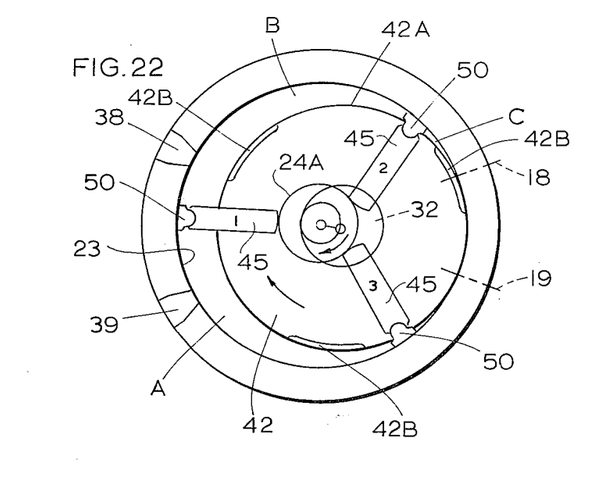
Figure 23:
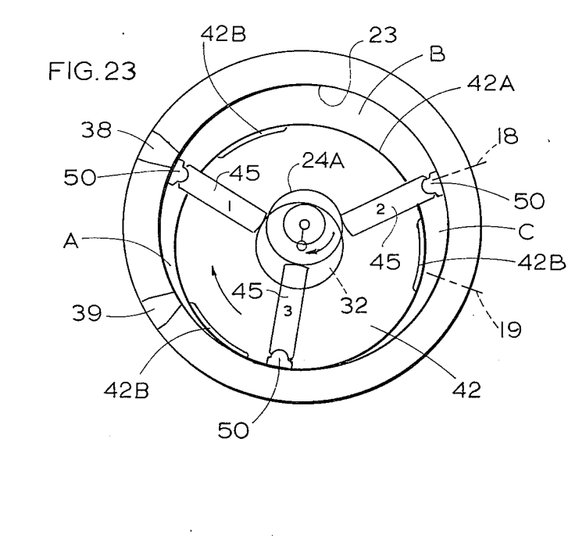

Chamber C in FIG. 12 is in its expansion phase, having passed through ignition in the position of FIG. 22. The other phases for the chamber C can be recognized by following the several views in sequence from FIG. 12 to FIG. 23.

From the foregoing, it is seen that the rotor 42 makes one complete rotation from FIG. 12 through FIGS. 23 and back to FIG. 12. In that rotation, chamber B produces a power pulse at FIG. 14, then 120° later chamber A produces a power pulse at FIG. 18, and 120° further chamber C produces a power pulse at FIG. 22. Accordingly, there are three power pulses in each rotation of rotor 42 and each is 120° apart.

The view of FIG. 3 includes forming the sleeve 24A with an axial extension 24B for the purpose of providing the surface for caging the inner ends of the vanes 45. If desired, the crankshaft 27 can have its surface at this location exposed by eliminating the extension 24B.

While the present description has set forth the details of an engine having one rotary piston, two or more rotary pistons may be joined in tandem, and when two pistons are so combined the second piston must have its firing order displaced by 180° from the firing order above described so that the ignition will occur every 60° of rotation of the pistons.

The foregoing description has set forth a preferred embodiment of rotary internal combustion engine which will satisfy the stated and other objects of the invention, and the details are believed sufficient so that those skilled in this art may make and use the same.

What is claimed is:

1. In a rotary internal combustion engine the combination of a frame having an internal circular peripheral wall and opposed axially spaced side walls defining an annular chamber, combustible fluid inlet port and an exhaust port located at a common side of said frame and opening through said peripheral wall to the chamber, an opening through said peripheral wall spaced from said inlet and exhaust port opening, spark ignition means in said opening, a rotary piston in said annular chamber and having a generally circular face, bearings in said frame concentric with said peripheral wall, a crankshaft carried by said frame bearings and formed with an eccentric element engaged in said piston, said eccentric element directing said piston into an orbiting path of rotation in said chamber, and sealing means carried by said piston at circumferentially spaced positions, each of said sealing means being carried by said piston in position to slide therein and remain in radially directed alignment with said piston while extending to engage said circular peripheral wall and having a width, as measured in the direction of said circular peripheral wall, sufficient to bridge said inlet port, exhaust port and opening for said spark ignition means, and each of said sealing means having an inner end abutting and movable into and out of radial alignment with said one frame bearing.

2. The rotary internal combustion engine set forth in claim 1, wherein each of said sealing means comprises a main body having its outer end spaced from said peripheral wall, and a sealing element mounted on said outer end extending into sealing engagement with said peripheral wall and opposed side walls, each of said seal elements having freedom to adjust its position relative to said body during the orbiting rotation of said rotary piston.

3. The rotary internal combustion engine set forth in claim 1, wherein said rotary piston has an axial width substantially equal to the axial spacing of said side walls, an annular ring of less axial width is formed on said piston in position to engage said crankshaft eccentric, an internal ring gear is carried by said piston at one side of said annular ring, and a gear is mounted in said frame in position to engage said internal ring gear, said gears having a ratio of one and one half revolution to one revolution such that for one revolution of said crankshaft said piston revolves 120°.

4. In a rotary internal combustion engine, a frame defining an annular chamber with spaced apart side walls and a peripheral wall, intake and exhaust ports and a spark plug opening formed in said peripheral wall and circumferentially spaced, spaced bearings in said frame, a crankshaft carried by said frame bearings to rotate about an axis concentric with said peripheral wall, an eccentric on said crankshaft between said side walls, a rotary piston having a radially inwardly directed central ring thereon in engagement on said eccentric, said piston having a width to span the distance between said side walls and to extend axially beyond said eccentric, a ring gear on said piston adjacent one side of said central ring, a fixed gear on said frame and engaged with said ring gear, said rotary piston having circumferentially spaced and radially directed slots opening radially outwardly and opening toward said crankshaft, and a sealing means in each slot having margins presented to said side walls and inner and outer ends presented toward one of said spaced bearings and toward said peripheral wall, each of said sealing means being sized, as measured circumferentially of said annular chamber, to fully cover said ports and opening during passage of the outer end of said sealing means as said piston rotates and each of said sealing means having a bearing cap on its inner end engaged on one of said spaced bearings and a rocker element operably seated on said outer end.

5. The rotary internal combustion engine set forth in claim 4, wherein each of said separate rocker elements has a curved surface opposite said face, a socket surface is formed in the outer end of each of said sealing means, said socket surface being generated about an axis lying in said rocker element, and said bearing cap on said inner end of said sealing means having a bearing surface engaged on one of said spaced bearings formed to a curvature with its center in said axis for the curved surface of said rocker element.

6. The rotary internal combustion engine set forth in claim 4, wherein said outer end on each of said sealing means is formed with a radially outwardly directed circular recess, a rocker element having a first surface substantially matching said circular recess and engaged thereon and a second surface substantially conforming to said peripheral wall of said annular chamber, and said inner end on each of said sealing means having an end face formed with a curved surface generated from the center of said circular recess, said one of said crankshaft supporting bearing in said frame having a surface presented to be engaged by said curved end face.

7. In a rotary internal combustion engine the combination of a frame having an annular chamber formed with a circular peripheral wall having a fuel inlet port, an exhaust port and at least one ignition means mounted in said peripheral wall, bearings in said frame, crankshaft means rotating in said bearings on an axis concentric with said circular peripheral wall, an eccentric on said crankshaft, a piston mounted to rotate on said eccentric and formed with a generally circular peripheral face movable internally tangent to said peripheral wall and movable past said ports and openings, circumferentially spaced vanes carried by said piston in constant radially directed alignment therein and having inner leg portions directed toward said crankshaft and outer ends directed toward said peripheral wall, a sealing element carried at said outer ends of said vanes to rock about an axis is said sealing element and having a face conformed to said peripheral wall, cap means carried by said inner leg of each vane, resilient means engaged on said cap means in position to displace said cap means radially and maintain said sealing element bearing on said peripheral wall, sealing blade means on said vanes and sealing elements in engagement with said chamber to divide the chamber into working spaces which sequentially progress about in said chamber and communicate with said ports and said ignition means, and said sealing elements move over said peripheral wall and sequentially cover said ports and ignition means to block cross-communication between said working spaces during piston rotation relative to said eccentric, and gear means in driving engagement and carried by said piston and frame to transmit piston rotation to said crankshaft.

8. In a rotary internal combustion engine the combination of: a frame defining an annular chamber having a cylindrical peripheral wall defining the boundary of said chamber, said peripheral wall being formed with circumferentially spaced openings constituting inlet and exhaust ports and spark plug opening; a crankshaft; spaced bearings in said frame extending into said chamber and supporting said crankshaft for rotation on an axis concentric with said peripheral wall; an eccentric on said crankshaft between said bearings; a piston operatively mounted on said eccentric and formed with a generally cylindrical peripheral face movable internally tangent to said chamber peripheral wall and past said spaced openings, said piston being formed with circumferentially spaced slots which are radially directed to open to said crankshaft bearings and to said chamber peripheral wall; and sealing means mounted in each radial slot in said piston, each sealing means having an inner portion extending inwardly past said eccentric and an outer portion extending toward said peripheral wall and formed with a circular socket, a rocker element having a portion conformed to said circular socket and an outer face conformed to said chamber peripheral wall, a cap mounted on said inner portion and formed with an abutment face engaged on one of said crankshaft bearings, said abutment face having a curved shape generated about a center which is the center for said circular socket; and resilient means between said cap and said inner portion constantly pressing said cap curved face on said one bearing and pressing said outer face on said rocker element against said chamber peripheral wall, said cap face being movable over said one bearing transverse to the crankshaft axis.

* * * * *